United States Patent
Nielsen et al.

(10) Patent No.: US 12,365,009 B2
(45) Date of Patent: Jul. 22, 2025

(54) AIR FILTER AND WIPER BLADES FOR REDUCING PARTICLE INSIDE ELECTRONIC DEVICES

(71) Applicant: ROKU, INC., San Jose, CA (US)

(72) Inventors: Mikkel Nielsen, San Jose, CA (US); Karina Levitian, Austin, TX (US)

(73) Assignee: Roku, Inc., San Jose, CA (US)

( * ) Notice: Subject to any disclaimer, the term of this patent is extended or adjusted under 35 U.S.C. 154(b) by 395 days.

(21) Appl. No.: 18/056,352

(22) Filed: Nov. 17, 2022

(65) Prior Publication Data

US 2024/0168531 A1    May 23, 2024

(51) Int. Cl.
| | |
|---|---|
| G06F 1/20 | (2006.01) |
| B01D 46/00 | (2022.01) |
| B01D 46/12 | (2022.01) |
| B08B 1/10 | (2024.01) |
| B08B 13/00 | (2006.01) |

(52) U.S. Cl.
CPC ......... *G06F 1/206* (2013.01); *B01D 46/0004* (2013.01); *B01D 46/0086* (2013.01); *B01D 46/12* (2013.01); *B08B 1/10* (2024.01); *B08B 13/00* (2013.01)

(58) Field of Classification Search
CPC ..................................................... G06F 1/206
See application file for complete search history.

(56) References Cited

U.S. PATENT DOCUMENTS

| | | | | |
|---|---|---|---|---|
| 10,286,349 | B2* | 5/2019 | Gregerson | ......... B01D 46/0086 |
| 11,607,635 | B2* | 3/2023 | Arthur | ................ B01D 46/429 |
| 2012/0000169 | A1* | 1/2012 | Ahn | ...................... B01D 46/10 55/383 |
| 2012/0151885 | A1* | 6/2012 | Nishihata | ............. B01D 46/681 55/289 |
| 2015/0241934 | A1* | 8/2015 | Balogh | ..................... G01P 5/06 73/861.85 |
| 2019/0313871 | A1* | 10/2019 | Sheng | ................... B01D 46/04 |
| 2022/0028430 | A1* | 1/2022 | Mizutani | ........... B01D 46/0036 |

FOREIGN PATENT DOCUMENTS

| | | | |
|---|---|---|---|
| CN | 111991936 A | * | 11/2020 |
| CN | 112815455 A | * | 5/2021 |
| KR | 101667233 B1 | * | 10/2016 |

* cited by examiner

*Primary Examiner* — Suresh Suryawanshi
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for reducing particles (e.g., dust, lint, or the like) inside electronic devices. An example embodiment operates by a media device including one or more memories and at least one processor each coupled to at least one of the one or more memories and configured to process media content. The media device further include one or more openings configured to pass air inside the media device and an air filter configured to filter the air passed inside the media device.

20 Claims, 5 Drawing Sheets

AIR FILTER AND WIPER BLADES FOR REDUCING PARTICLE INSIDE ELECTRONIC DEVICES

BACKGROUND

Field

This disclosure is generally directed to methods and systems for reducing particles (e.g., dust, lint, or the like) inside electronic devices, and more particularly to air filters and/or wiper blades to remove or reduce particle inside electronic devices.

Background

Electronic devices such as, but not limited to, TVs, set-top box, or the like, can collect particles (e.g., dust, lint, or the like). These particles can enter the electronic device and can stay on different circuits and modules within the electronic device. These particles can have negative effect on the operations of the electronic device. For example, these particles can have negative effect on the thermal conductivity of the electronic device, and therefore, can have negative effect on the temperature of the circuits and modules within the electronic device. The life of the electronic device can be negatively affected by higher temperature because of the accumulated particles.

SUMMARY

Provided herein are system, apparatus, article of manufacture, method and/or computer program product embodiments, and/or combinations and sub-combinations thereof, for reducing particles (e.g., dust, lint, or the like) inside electronic devices. For example, systems, apparatuses, and/or methods are provided for using air filters and/or wiper blades to remove or reduce particles inside electronic devices. Although some embodiments are discussed with respect to examples of air filters and/or wiper blades, the embodiments of this disclosure are not limited to these examples and the embodiments of this disclosure can use other air filters, wiper blades, and/or other devices/methods for reducing particles inside electronic devices.

According to some embodiments, by using the air filters and/or wiper blades in an electronic device, the life span of the electronic device can be increased. Similarly, the life span of the components of the electronic device can be increased. Additionally, using the air filters and/or wiper blades in the electronic device can decrease the operating temperature of the electronic device. Also, using the air filters and/or wiper blades in the electronic device can reduce the need for or the periodicity of cleaning inside of the electronic device by, for example, opening the electronic device.

An example embodiment operates by a media device including one or more memories and at least one processor each coupled to at least one of the one or more memories and configured to process media content. The media device further include one or more openings configured to pass air inside the media device and an air filter configured to filter the air passed inside the media device.

The air filter may be located upstream of the one or more openings or downstream from the one or more openings. The media device further may include a fan configured to cool inside the media device, wherein the air filter is located downstream of the fan.

The air filter may include an electrostatic filter, a fiberglass filter, a polyester filter, a pleated filter, a washable filter, a high efficiency particulate arrestance (HEPA) filter, or a spun glass filter. In some implementations, the air filter may include a material including one or more of paper, foam, carbon, aluminum, steel, fiber glass, or plastic.

The media device may further include a filter housing configured to house the air filter, where the air filter is a removable filter.

The media device may further include a fan configured to cool inside the media device, a wiper blade configured to remove particles from at least one of the fan or the air filter, and a motor coupled to the wiper blade and configured actuate the wiper blade. The at least one processor can be further configured to control the motor for actuating the wiper blade.

The media device may further include a sensor configured to monitor at least one of the fan or the air filter. The at least one processor can be further configured to control the motor for actuating the wiper blade based on the monitoring the at least one of the fan or the air filter. The at least one processor can be configured to control the motor for actuating the wiper blade based on a received request or based on a predetermined time period.

The media device may further include a sensor configured to monitor the air filter and an indication light configured to specify a status of the air filter.

The media device may further include a sensor configured to monitor the air filter. The at least one processor can be further configured to shut off the media device or cause the air filter to be ejected based on the monitor of the air filter.

The air filter may include two or more air filter components each one of the two or more air filter components is configured to filter the air passed inside the media device.

An example embodiment operates by a media system including a display device configured to display media content and a media device coupled to the display device. The media device includes one or more memories and at least one processor each coupled to at least one of the one or more memories and configured to process the media content for display on the display device. The media device further includes one or more openings configured to pass air inside the media device and a fan configured to cool inside the media device. The media device further includes an air filter configured to filter the air passed inside the media device and a wiper blade configured to remove particles from at least one of the fan or the air filter.

An example embodiment operates by a computer-implemented method for removing particles from inside of a media device. The method includes monitoring, by at least one computer processor of the media device, an air filter of the media device and monitoring, by the at least one computer processor, a fan inside the media device. The method further includes providing, by the at least one computer processor, an indication of a status of the air filter based on the monitoring the air filter. The method further includes controlling, by the at least one computer processor, a motor associated with a wiper blade inside the media device to actuate the wiper blade based on the monitoring the fan.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for reducing particles inside electronic devices.

Figure 1:
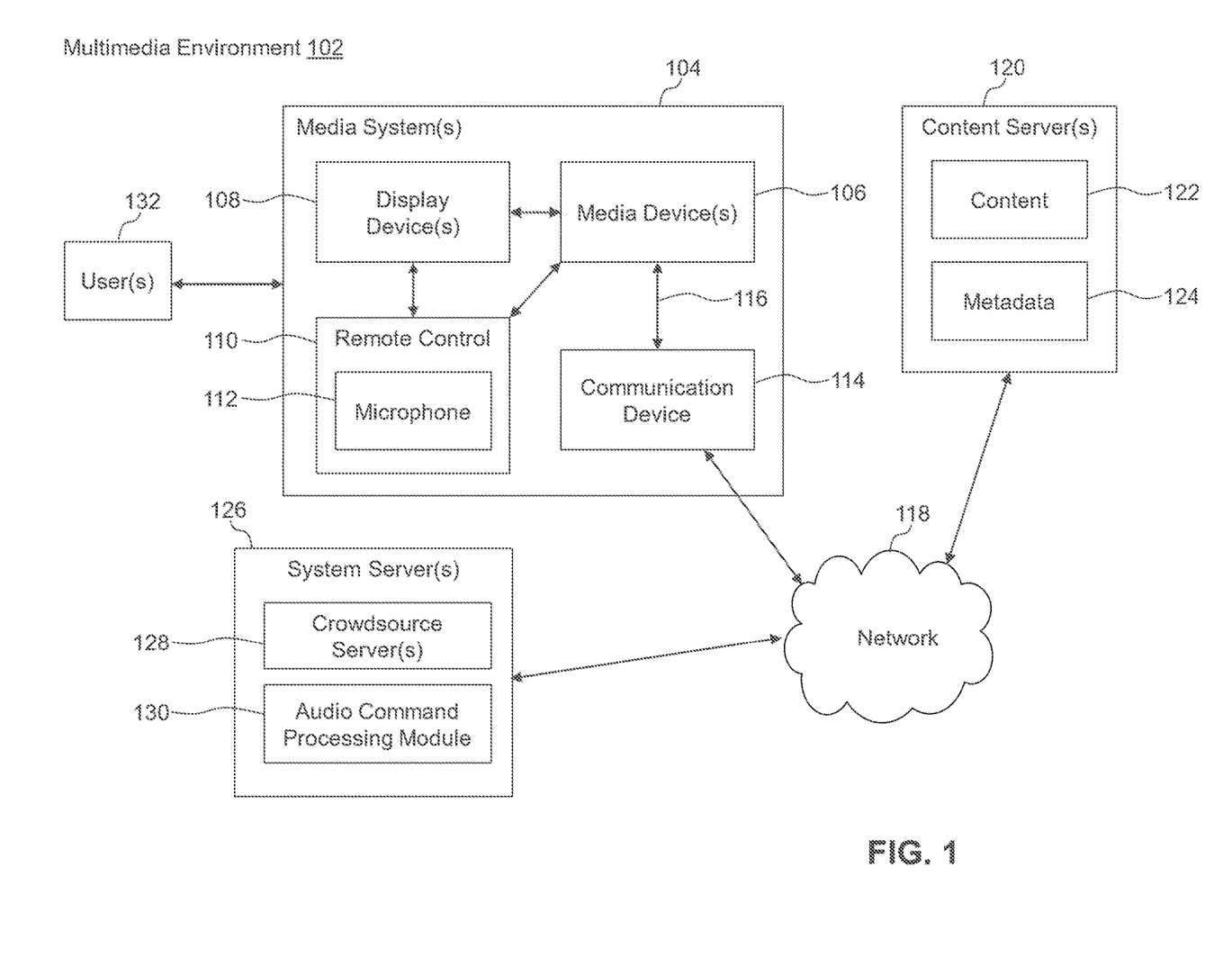
FIG. 1 illustrates a block diagram of a multimedia environment, according to some embodiments.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers, channels or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowd-source server(s) 128 may operate to cause closed captioning to be automatically turned on and/or off during future streamings of the movie.

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
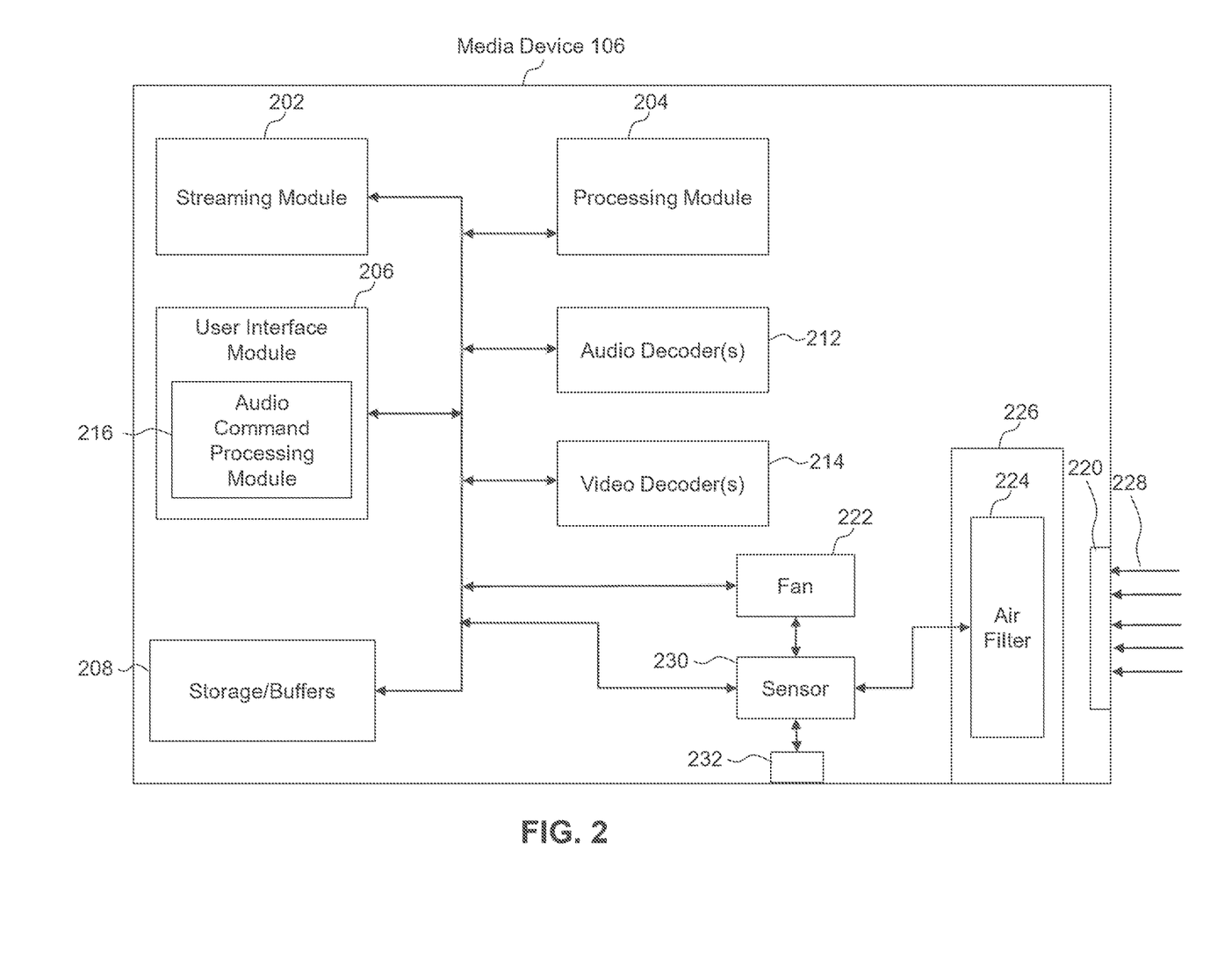
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Particles Reduction System for Electronic Devices

According to some embodiments, the media device 106 can include one or more additional components configured to increase the life of the media device 106 and/or the life of the components of the media device 106. The one or more additional components can also decrease the operating temperature of the media device 106 and/or reduce the need for or the periodicity of cleaning inside of the media device 106 by, for example, opening the electronic device.

The media device 106 can include one or more of one or more openings 220, one or more fans 222, one or more air filters 224, one or more filter housings 226, one or more sensors 230, and one or more indicators 232. It is noted that the number of these components and the locations of these components within the media device 106 are provided merely as an example. The media device 106 can include additional and/or fewer components as would be appreciated by a person of ordinary skill in the art.

The media device 106 can include the one or more openings 220. The one or more openings 220 can be configured to pass air inside the media device 106. For example, the one or more openings 220 can be configured to let air flow 228 inside the media device 106. The air flow 228 can be used to cool the components within the media device 106. The number and the location of the one or more openings 220 can depend on one or more factors. For example, the number and the location of the one or more openings 220 can depend on the design of the media device 106, the dimensions of the media device 106, the components within the media device 106, the use of the media device 106, or the like.

The media device 106 can include one or more fans 222 (herein referred to as fan 222). The fan 222 can be an optional component of the media device 106. In other words, the media device 106 can include no fan, one fan 222, or a plurality of fans 222. According to some embodiments, the fan 222 can be configured to cool inside of the media device by, for example, drawing the air flow 228 inside the media device 106. In some implementations, the fan 222 can be a removable fan. For example, the fan 222 can be located within the media device 106 such that the fan 222 can be easily accessible by a user of the media device 106. The fan 222 can be easily removed and reinstalled. By removing the fan 222, the user can clean the fan 222 from particles (e.g., dust, lint, or the like). The user can then reinstall the fan 222 within the media device 106. In some examples, the media device 106 can include a housing (not shown) for the fan 222.

The media device 106 can include one or more air filters 224 (herein referred to as air filter 224). According to some embodiments, the number of air filters 224, the locations of air filters 224, the dimensions of air filter 224, the material of air filter 224 can depend on one or more factors such as, but not limited to, the design of the media device 106, the dimensions of the media device 106, the components within the media device 106, the use of the media device 106, or the like.

The air filter 224 can include one or more an electrostatic filter, a fiberglass filter, a polyester filter, a pleated filter, a washable filter, a high efficiency particulate arrestance (HEPA) filter, a spun glass filter, or the like. For example, the air filter 224 can be made of materials such as, but not limited to, one or more of paper, foam, carbon, aluminum, steel, fiber glass, or plastic.

The air filter 224 can include an electrostatic filter that can use static electricity to capture particles. In some examples, the electrostatic filter can include one or more polyurethane layer and one or more polypropylene layers with one or more filtration media that can generate the static electricity.

In some implementations, the air filter 224 can be located at the upstream of the one or more openings 220. The upstream can be defined based on the direction of air flow 228. For example, as shown in FIG. 2, the air filter 224 is located after (e.g., upstream of) the one or more opening 220. In this example, the air filter 224 is located after the air intake of the media device 106. In some examples, the air filter 224 can be located before (e.g., downstream of) the fan 222 (e.g., before air intake of the fan 222). Additionally, or alternatively, the fan 222 can be located after (e.g., upstream of) the fan 222 (e.g., after air intake of the fan 222).

In some implementations, the air filter 224 can be located at the downstream of the one or more openings 220. The downstream can be defined based on the direction of air flow 228. For example, the air filter 224 can be located before (e.g., downstream of) the one or more opening 220. In this example, the air filter 224 can be located before the air intake of the media device 106.

It is noted that although the media device 106 may include the air filter 224, the media device 106 can still operate if the air filter 224 is removed.

The air filter 224 may include two or more air filter components. In these examples, each one of the two or more air filter components can be configured to filter the air passed inside the media device 106. According to some embodiments, at least some of the two or more air filter components can be different air filters and/or be made from different materials. Alternatively, the two or more air filter components can be the same air filters and/or be made from the same materials.

The air filter 224 may be located in the filter housing 226. The filter housing 226 that houses the air filter 224 can be accessible by the user of the media device such that the user can remove the air filter 224 and reinstall the air filter. In these examples, the air filter 224 can be a removable air filter. For example, the user can remove the air filter 224, clean the air filter 224, and reinstall the air filter. Additionally, or alternatively, the user can remove the air filter 224 and install a new air filter 224. In some examples, the filter housing 226 can include one or more flaps configured to be opened or closed to remove and/or install the air filter 224. In some examples, the filter housing 226 can be retractable.

The media device 106 can include one or more sensors 230 (herein referred to as sensor 230). The sensor 230 can be configured to monitor the air filter 224. For example, the sensor 230 can be configured to monitor the status of the air filter 224. The sensor 230 can determine how clean or how dirty the air filter 224 is. In other words, the sensor 230 can monitor the amount of particles on the air filter 224. In a non-limiting example, the sensor 230 can be configured to measure the air flow through the air filter 224 for monitoring the air filter 224. However, other sensors can be used as the sensor 230 for monitoring the air filter 224.

According to some implementations, the sensor 230, the processing module 204, or the combination of the sensor 230 and the processing module 204 can perform additional operations based on the monitoring of the air filter 224. For example, the sensor 230 and/or the processing module 204 can estimate the amount of particles on the air filter 224 and compare the estimate amount of particles with a threshold. If the estimate amount of particles is greater than the threshold, the sensor 230 and/or the processing module 204 can perform the additional operations. In this example, the sensor 230 and/or the processing module 204 can estimate the amount of particles on the air filter 224 by estimating the air flow through the air filter 224. The sensor 230 and/or the processing module 204 can compare the estimate air flow with an air flow threshold. If the estimate air flow is less than the air flow threshold, the sensor 230 and/or the processing module 204 can perform the additional operations.

In some embodiments, the additional operations can include using the indicator 232 to indicate the status of the air filter. In some examples, the indicator 232 can include an indication light specifying the status of the air filter 224. In these examples, the indicator 232 can use different colors to show how dirty or clean the air filter 224 is. In some examples, the indicator 232 can include a display that can specify the status of the air filter with more details.

In some embodiments, the additional operations can include shutting off the media device 106. For example, the sensor 230 and/or the processing module 204 can shut off the power in the media device 106. Additionally, or alternatively, the sensor 230 and/or the processing module 204 can shut off the power to one or more components of the media device 106.

In some embodiments, the additional operations can include causing the air filter 224 to be ejected from the media device 106. For example, media device 106 (e.g., using the filter housing 226) can include an ejection component (not shown) for ejecting the air filter 224. In these examples, the sensor 230 and/or the processing module 204 can activate the ejection component for ejecting the air filter 224 based on monitoring the air filter 224.

In addition to, or alternatively to, using the air filter 224, the media device 106 can using one or more wiper blades for removing particles from inside the electronic device 106. The one or more wiper blades can increase the life of the media device 106, can increase the life of the components of the media device 106, can decrease the operating temperatures of the media device 106, can reduce the need for or the periodicity of cleaning inside of the media device 106 by, for example, opening the electronic device, or the like.

In some embodiments, the media device 106 can include an opening for easy access to the air filter 224 and/or to the fan 222. For example, the opening can be a slot that allows easy access to the air filter 224 and/or to the fan 222. A user can use the opening (e.g., the slot) to access the air filter 224 and/or to the fan 222 to, for example, clean the air filter 224 and/or to the fan 222 using, for example, a brush (or other cleaning devices). In some examples, the opening (e.g., the slot can be at the filter housing 226. However, the opening can be located at other places at the media device 106.

Figure 3A:
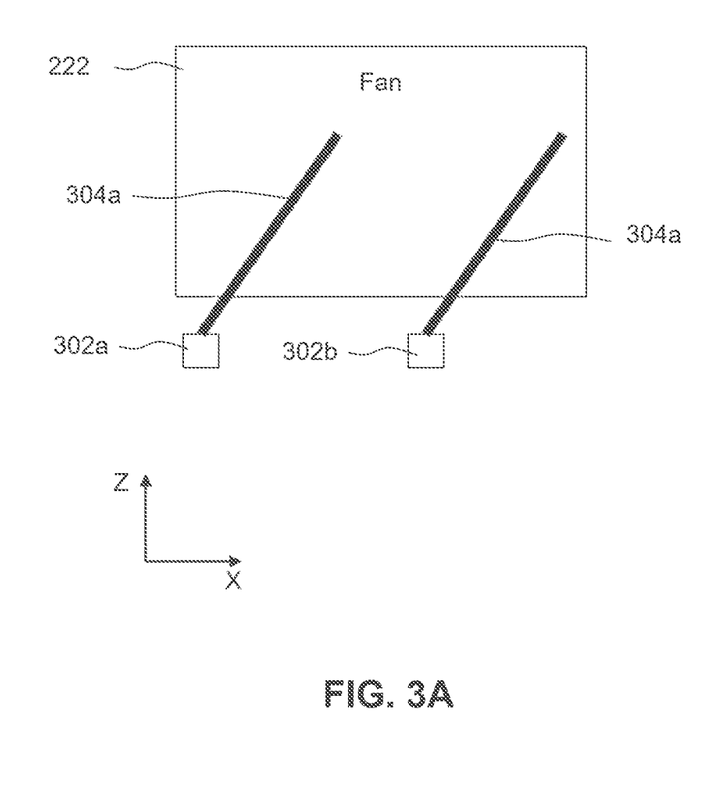
FIGS. 3A and 3B illustrate a block diagram of one or more wiper blades for the media device, according to some embodiments.
Figure 3B:
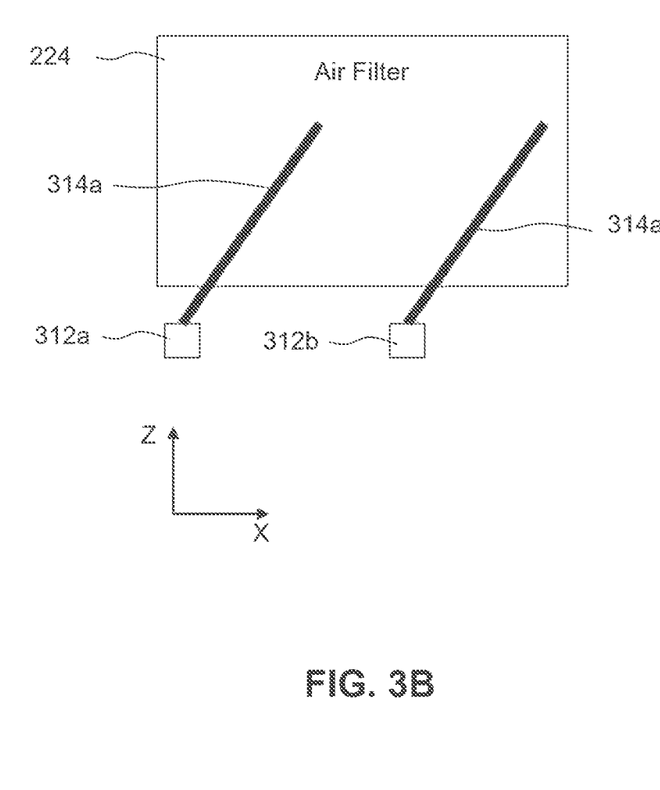

FIGS. 3A and 3B illustrate a block diagram of one or more wiper blades for the media device, according to some embodiments. For example, FIG. 3A illustrates wiper blades 304a and 304b used with the fan 222. FIG. 3B illustrates wiper blades 314a and 314b used with the air filter 224.

The media device 106 can include one or more wiper blades (e.g., wiper blades 304a, 304b, 314a, and 314b). The wiper blades can be used for the fan 222, for the air filter 224, or for both. Additionally, or alternatively, the wiper blades can be used for other components of the media device 106. Although two wiper blades are show in FIGS. 3A and 3B for the fan 222 and the air filter 224, any number of wiper blades can be used for each component of the media device 106.

The wiper blade 304a (or 304b) may be coupled to motor 302a (or 302a). The motor 302a (or 302b) can be configured to actuate the wiper blade 304a (or 304b). For example, the motor 302a (or 302b) can be configured to move the wiper blade 304a (or 304b) over the fan 222 to clean (e.g., remove the particles from) the fan 222. Each wiper blade 304a and 304b can be coupled to one motor 302a and 302b. Alternatively, both wiper blades 304a and 304b can be coupled to one motor (e.g., the motor 302a or the motor 302b).

Similarly, the wiper blade 314a (or 314b) may be coupled to motor 312a (or 312a). The motor 312a (or 312b) can be configured to actuate the wiper blade 314a (or 314b). For example, the motor 312a (or 312b) can be configured to move the wiper blade 314a (or 314b) over the air filter 224 to clean (e.g., remove the particles from) the air filter 224. Each wiper blade 314a and 314b can be coupled to one motor 312a and 312b. Alternatively, both wiper blades 314a and 314b can be coupled to one motor (e.g., the motor 312a or the motor 312b).

The number of wiper blades (e.g., the wiper blades 304a, 304b, 314a, 314b), the locations of the wiper blades, the dimensions of the wiper blades, the material of the wiper blades may depend on one or more factors such as, but not limited to, the design of the media device 106, the dimensions of the media device 106, the components within the media device 106, the use of the media device 106, or the like. In some examples, the wiper blades can be made of plastic. However, the embodiments of this disclosure are not limited to these examples and the wiper blades can include other materials.

According to some embodiments, the motors 302a and 302b (herein also referred to as motor 302) and the motors 312a and 312b (herein also referred to as motor 312) can be coupled to sensors 230 and/or the processing module 204. According to some embodiments, the processing module 204 can be configured to control the motor 302 and/or the motor 312 for actuating the wiper blades 304a and 304b (herein also referred to as the wiper blades 304) and/or the wiper blades 314a and 314b (herein also referred to as the wiper blades 314).

For example, the processing module 204 can be configured to control the motor 302 (or 312) for actuating the wiper blades 304 (or 314) based on a predetermined time period. In other words, the processing module 204 can actuate the wiper blades 304 (or 314) at the predetermined time period. The predetermined time period can be, but is not limited to, every 1 minute, every 5 minutes, every 30 minutes, every hour, every 5 hours, every 12 hours, every 24 hours, or the like. Additionally, or alternatively, the processing module 204 can be configured to control the motor 302 (or 312) for actuating the wiper blades 304 (or 314) based on a received request. For example, the user of the media device can use a key on the media device 106 and/or the remote control 110 to initiate the processing module 204 to actuate the wiper blades 304 (or 314).

The sensor 230 of FIG. 2 may be configured to monitor the fan 222 and/or the air filter 224. For example, the sensor 230 can be configured to monitor the status of the fan 222 and/or the air filter 224. The sensor 230 can determine how clean or how dirty the fan 222 and/or the air filter 224 are. In other words, the sensor 230 can monitor the amount of particles on the fan 222 and/or the air filter 224. In a non-limiting example, the sensor 230 can be configured to measure the air flow through the fan 222 and/or the air filter 224 for monitoring the air filter 224. However, other sensors can be used as the sensor 230 for monitoring the fan 222 and/or the air filter 224.

The sensor 230, the processing module 204, or the combination of the sensor 230 and the processing module 204 can perform additional operations based on the monitoring of the fan 222 and/or the air filter 224. For example, the sensor 230 and/or the processing module 204 can estimate the amount of particles on the air the fan 222 and/or the air filter 224, and compare the estimate amount of particles with a threshold. If the estimate amount of particles is greater than the threshold, the sensor 230 and/or the processing module 204 can perform the additional operations. In this example, the sensor 230 and/or the processing module 204 can estimate the amount of particles on the fan 222 and/or the air filter 224 by estimating the air flow through the fan 222 and/or the air filter 224. The sensor 230 and/or the processing module 204 can compare the estimate air flow with an air flow threshold. If the estimate air flow is less than the air flow threshold, the sensor 230 and/or the processing module 204 can perform the additional operations.

In some embodiments, the additional operations can include controlling the motor 302 (or 312) for actuating the wiper blades 304 (or 314) based on monitoring the fan 222 and/or the air filter 224. For example, if the sensor 230 and/or the processing module 204 determines that the fan 222 and/or the air filter 224 are "dirty", the sensor 230 and/or the processing module 204 is configured to control the motor 302 (or 312) for actuating the wiper blades 304 (or 314) based on monitoring the fan 222 and/or the air filter 224. As discussed above, determining whether the fan 222 and/or the air filter 224 are "dirty" can include, but is not limited to, determining whether the estimate amount of particles is greater than the threshold, determining whether the estimate air flow is less than the air flow threshold, or the like.

In some embodiments, the media device 106 can include an opening for easy access to the wiper blades 304 (or 314). The opening can be the same as, or different from, the opening used for accessing the air filter 224 and/or to the fan 222. A user can use the opening (e.g., the slot) to access the wiper blades 304 (or 314) to, for example, clean the wiper blades 304 (or 314) using, for example, a brush (or other cleaning devices).

Figure 4:
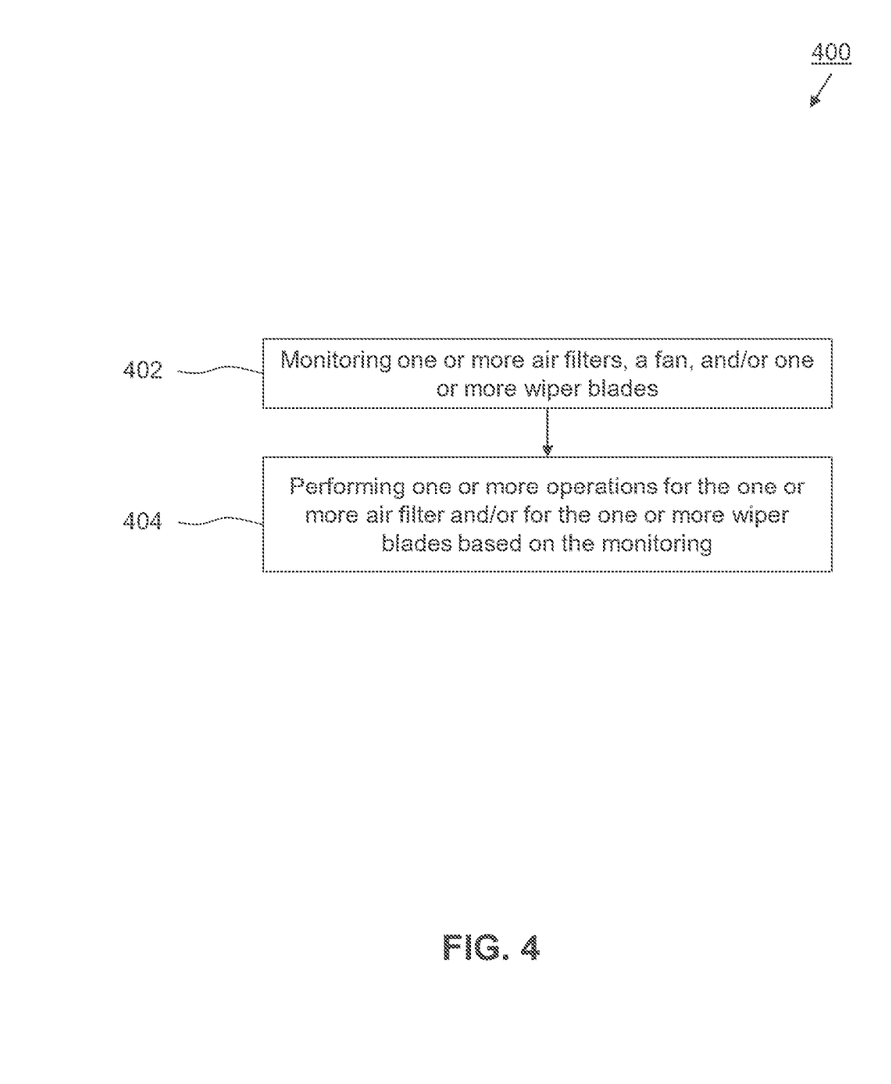
FIG. 4 illustrates an example method for reducing particles inside electronic devices, according to some embodiments.

FIG. 4 illustrates an example method 400 for reducing particles inside electronic devices, according to some embodiments. As a convenience and not a limitation, FIG. 4 may be described with regard to elements of FIGS. 1-3. Method 400 may represent the operation of a media device (e.g., the media device 106 of FIGS. 1 and 2) for particle reduction. But method 400 is not limited to the specific aspects depicted in those figures and other systems may be used to perform the method as will be understood by those skilled in the art. It is to be appreciated that not all operations may be needed, and the operations may not be performed in the same order as shown in FIG. 4.

At 402, one or more air filters, a fan, and/or a one or more wiper blades are monitored. For example, a media device can monitor the one or more air filters, the fan, and/or the one or more wiper blades present in the media device. For example, the sensor 230, the processing module 204, or the combination of the sensor 230 and the processing module 204 can monitor the one or more air filters 224, the fan 222, and/or the one or more wiper blades 304/314 present in the media device 106. The one or more air filters can be provided for the media device 106. The one or more air filters can be used to filter the air that is passed inside the media device. The one or more air filters can remove particles in the air that is passed inside the media device. The one or more wiper blades 304 or 314 can also be provided for the media device 106. The one or more wiper blades can be used to remove particles from a fan (e.g., the fan 222) of the media device, from the one or more filters, and/or from other components of the media device.

Monitoring the one or more air filters, the fan, and/or the one or more wiper blades can include monitoring the one or more air filters of the media device. Monitoring the one or more air filters, the fan, and/or the one or more wiper blades can include monitoring the fan of the media device. Monitoring the one or more air filters, the fan, and/or the one or more wiper blades can include monitoring the one or more wiper blades. Monitoring the one or more air filters, the fan, and/or the one or more wiper blades can include determining how "dirty" the one or more air filters, the fan, and/or the one or more wiper blades are. According to some implementations, monitoring the one or more air filters, the fan, and/or the one or more wiper blades can include estimating the amount of particles on the one or more air filters, the fan, and/or the one or more wiper blades. The monitoring of operation 402 can further include comparing the estimate amount of particles with a threshold. If the estimate amount of particles is greater than the threshold, then additional operations can be performed at 404.

According to some implementations, monitoring the one or more air filters, the fan, and/or the one or more wiper blades can include estimating the air flow through the one or more air filters, the fan, and/or the one or more wiper blades. The monitoring of operation 402 can further include comparing the estimate air flow with an air flow threshold. If the estimate air flow is less than the air flow threshold, then additional operations can be performed at 404.

At 404, one or more operations are performed for the one or more air filters and/or for the one or more wiper blades based on the monitoring operation 402. For example, the media device (e.g., the media device 106) can perform one or more operations for the one or more air filters and/or for the one or more wiper blades based on the monitoring operation 402. For example, the sensor 230, the processing module 204, or the combination of the sensor 230 and the processing module 204 can perform the one or more operations for the one or more air filters and/or for the one or more wiper blades of the media device 106 based on the monitoring operation 402.

In some implementations, the one or more operations can include using an indicator (e.g., the indicator 232) to indicate the status of the one or more air filters. In some implementations, the one or more operations can include shutting off the media device (e.g., shutting off the power in the media device, shutting off the power to one or more components of the media device, or the like). In some implementations, the one or more operations can include causing the one or more air filters to be ejected from the media device. These operations performed on the one or more air filters can be based on monitoring the one or more air filters. Additionally, or alternatively, the operations performed on the one or more air filters can be based on monitoring the fan. Additionally, or alternatively, the operations performed on the one or more air filters can be based on monitoring the wiper blades. Additionally, or alternatively, the operations performed on the one or more air filters can be based on monitoring other components of the media device.

In some implementations, the one or more operations can include actuating the one or more wiper blades for removing the particles from the fan, the one or more filters, or the other components of the medial device. Actuating the one or more wiper blades can include controlling one or more motors associated with the wiper blade(s) inside the media device to actuate the wiper blade(s). The operations performed on the one or more wiper blades can be based on monitoring the one or more air filters. Additionally, or alternatively, the operations performed on the one or more wiper blades can be based on monitoring the fan. Additionally, or alternatively, the operations performed on the one or more wiper blades can be based on monitoring the one or more wiper blades.

Although some examples are discussed above with respect to a media device, the embodiments of this disclosure are not limited to these examples and the air filter(s) and/or wiper blade(s) of this disclosure can be used in other electronic devices such as, but not limited to, display devices.

Example Computer System

Figure 5:
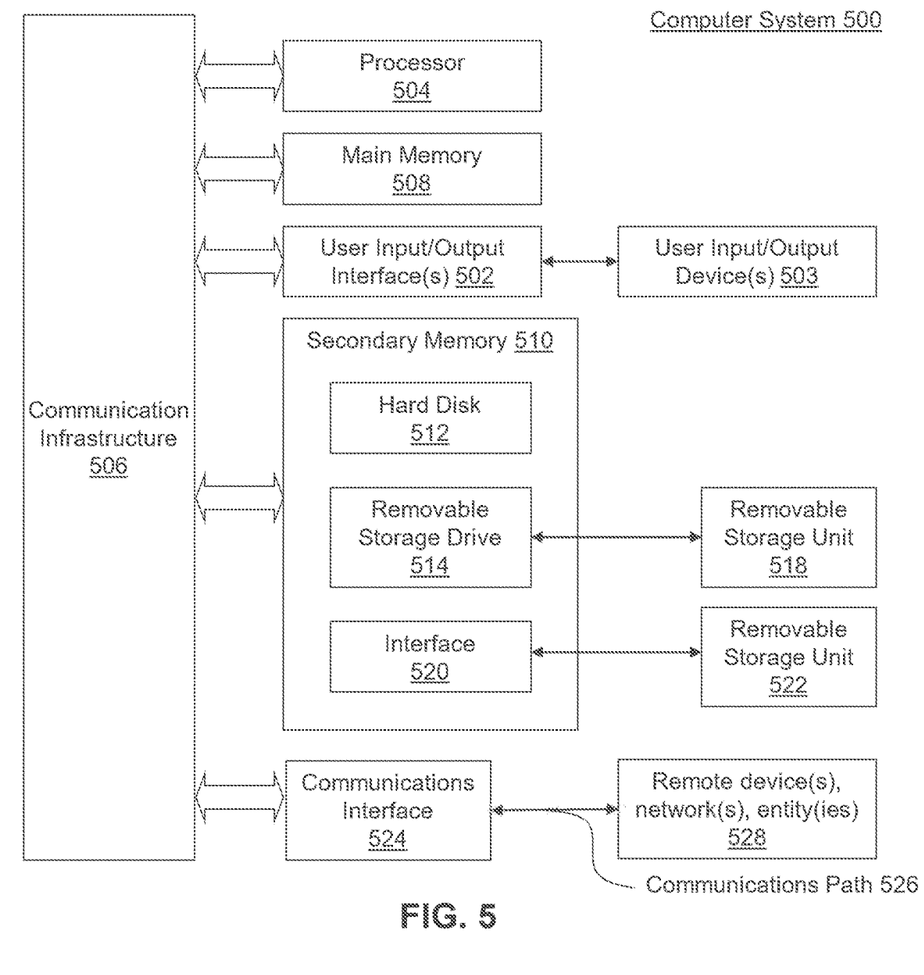
FIG. 5 illustrates an example computer system that can be used for implementing various embodiments.

Various embodiments may be implemented, for example, using one or more well-known computer systems, such as computer system 500 shown in FIG. 5. For example, the media device 106 may be implemented using combinations or sub-combinations of computer system 500. Also or alternatively, the method 400 or part of the method 400 may be implemented using combinations or sub-combinations of computer system 500. Also or alternatively, one or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500 or processor(s) 504), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A media device, comprising:
one or more memories;
at least one processor each coupled to at least one of the one or more memories and configured to process media content;
one or more openings configured to pass air inside the media device;
an air filter configured to filter the air passed inside the media device;
a fan configured to cool inside the media device; and
a wiper blade configured to remove particles from the fan.

2. The media device of claim 1, wherein the air filter is located at one or more of upstream of the one or more openings or downstream from the one or more openings based on a direction of an air flow from the one or more openings.

3. The media device of claim 1, wherein the air filter is located downstream of the fan based on a direction of an air flow from the one or more openings.

4. The media device of claim 1, wherein the air filter comprises an electrostatic filter, a fiberglass filter, a polyester filter, a pleated filter, a washable filter, a high efficiency particulate arrestance (HEPA) filter, or a spun glass filter.

5. The media device of claim 1, wherein the air filter comprises a material including one or more of paper, foam, carbon, aluminum, steel, fiber glass, or plastic.

6. The media device of claim 1, further comprising a filter housing configured to house the air filter, wherein the air filter is a removable filter.

7. The media device of claim 1, further comprising:
a second wiper blade configured to remove other particles from the air filter;
a first motor coupled to the wiper blade and configured to actuate the wiper blade; and
a second motor coupled to the second wiper blade and configured to actuate the second wiper blade.

8. The media device of claim 7, wherein the at least one processor is further configured to control the first motor for actuating the wiper blade and to control the second motor for actuating the second wiper blade.

9. The media device of claim 8, further comprising:
a first sensor configured to monitor the fan; and
a second sensor configured to monitor the air filter,
wherein the at least one processor is further configured to:
control the first motor for actuating the wiper blade based on the monitoring the fan, and
control the second motor for actuating the second wiper blade based on the monitoring the air filter.

10. The media device of claim 8, wherein the at least one processor is configured to control at least one of the first motor or the second motor for actuating at least one of the wiper blade or the second wiper blade based on a received request or based on a predetermined time period.

11. The media device of claim 1, further comprising:
a sensor configured to monitor the air filter; and
an indication light configured to specify a status of the air filter.

12. The media device of claim 1, further comprising:
a sensor configured to monitor the air filter,
wherein the at least one processor is further configured to shut off the media device or cause the air filter to be ejected based on the monitoring of the air filter.

13. The media device of claim 1, wherein the air filter comprises two or more air filter components, each one of the two or more air filter components configured to filter the air passed inside the media device.

14. A media system, comprising:
a display device configured to display media content; and
a media device coupled to the display device, the media device comprising:
one or more memories;
at least one processor each coupled to at least one of the one or more memories and configured to process the media content for display on the display device;
one or more openings configured to pass air inside the media device;
a fan configured to cool inside the media device;
an air filter configured to filter the air passed inside the media device;
a first wiper blade configured to remove particles from the air filter; and
a second wiper blade configured to remove other particles from the fan.

15. The media system of claim 14, wherein the air filter is located at one or more of upstream of the one or more openings, downstream from the one or more openings, or downstream of the fan based on a direction of an air flow from the one or more openings.

16. The media system of claim 14, wherein the air filter comprises an electrostatic filter, a fiberglass filter, a polyester filter, a pleated filter, a washable filter, a high efficiency particulate arrestance (HEPA) filter, or a spun glass filter.

17. The media system of claim 14, further comprising:
a first motor coupled to the first wiper blade and configured actuate the first wiper blade; and
a second motor coupled to the second wiper blade and configured actuate the second wiper blade, wherein the at least one processor is further configured to control the first motor for actuating the first wiper blade and to control the second motor for actuating the second wiper blade.

18. The media system of claim 17, further comprising:
a first sensor configured to monitor the air filter by estimating a first air flow through the air filter and comparing the estimated first air flow with a first air flow threshold; and
a second sensor configured to monitor the fan by estimating a second air flow through the fan and comparing the estimated second air flow with a second air flow threshold,
wherein the at least one processor is further configured to;
control the first motor for actuating the first wiper blade based on the monitoring the the air filter, based on a first received request, or based on a first predetermined time period, and
control the second motor for actuating the second wiper blade based on the monitoring the fan, based on a second received request, or based on a second predetermined time period.

19. The media system of claim 14, further comprising:
a sensor configured to monitor the air filter; and an indication light configured to specify a status of the air filter, wherein the at least one processor is further configured to shut off the media device or cause the air filter to be ejected based on the monitoring of the air filter.

20. A computer-implemented method for removing particles from inside of a media device, the computer-implemented method comprising:

monitoring, by at least one computer processor of the media device, an air filter of the media device;

monitoring a fan inside the media device;

providing an indication of a status of the air filter based on the monitoring the air filter; and controlling a motor associated with a wiper blade inside the media device to actuate the wiper blade based on the monitoring the fan to remove particles from the fan.

* * * * *